US009456412B2

(12) United States Patent
Cheng

(10) Patent No.: US 9,456,412 B2
(45) Date of Patent: Sep. 27, 2016

(54) ELECTRONIC DEVICE AND METHOD FOR SELECTING ACCESS POINT NAME

(71) Applicant: Chiun Mai Communication Systems, Inc., New Taipei (TW)

(72) Inventor: Yuan-Shou Cheng, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 48 days.

(21) Appl. No.: 14/498,141

(22) Filed: Sep. 26, 2014

(65) Prior Publication Data

US 2015/0098413 A1 Apr. 9, 2015

(30) Foreign Application Priority Data

Oct. 8, 2013 (CN) .......................... 2013 1 0465797

(51) Int. Cl.
*H04W 48/20* (2009.01)

(52) U.S. Cl.
CPC .................................... *H04W 48/20* (2013.01)

(58) Field of Classification Search
CPC . H04W 48/20; H04W 84/12; H04W 76/022; H04W 8/245; H04W 76/02; H04W 76/04; H04W 88/06; H04L 29/12311; H04L 69/40; H04L 29/12396; H04L 29/12594; H04L 29/12783; H04L 61/2084; H04L 61/2514; H04L 61/2525; H04L 61/3075; H04L 61/35; H04L 63/02; H04M 1/7253; H04M 2250/02; H04M 2250/06
See application file for complete search history.

(56) References Cited

U.S. PATENT DOCUMENTS

| | | | | |
|---|---|---|---|---|
| 8,160,038 B1 * | 4/2012 | Zhao | H04L 61/2015 | 370/338 |
| 8,599,790 B1 * | 12/2013 | Damle | H04W 76/022 | 370/331 |
| 2004/0125762 A1 * | 7/2004 | Haller | H04L 29/12311 | 370/313 |
| 2012/0113865 A1 * | 5/2012 | Zhao | H04W 48/20 | 370/254 |
| 2013/0223421 A1 * | 8/2013 | Gundavelli | H04W 76/022 | 370/338 |
| 2014/0161011 A1 * | 6/2014 | Hara | H04W 52/0274 | 370/311 |
| 2014/0161026 A1 * | 6/2014 | Stojanovski | H04L 45/22 | 370/328 |
| 2014/0177446 A1 * | 6/2014 | Sun | H04L 45/38 | 370/236 |

* cited by examiner

*Primary Examiner* — Yee Lam
(74) *Attorney, Agent, or Firm* — Zhigang Ma

(57) ABSTRACT

Method of selecting an Access Point Name (APN) includes selecting one APN from an APN list when a network connection state of an electronic device is idle and the APN list has at least one APN. The electronic device includes a storage device that stores a APN list. A connection is established between the electronic device and a wide area network using the selected APN. When the connection is established using the selected APN, the method determines that the selected APN is a preferred APN.

14 Claims, 3 Drawing Sheets

300
Start
S310 Is a network connection state of an electronic device idle?
Y / N
S311 Update the APN list by inserting one or more APNs
S312 Select one APN from the APN list
S313 Is a connection established between the electronic device and a wide area network using the selected APN
Y / N
S314 Determine the selected APN to be the preferred APN
S315 Delete the selected APN from the APN list
S316 Does the APN list have other APNs
Y / N
S317 Set the network connection state to be scanning
S318 Are the selected APN and the other APNs inactive
Y / N
S320 Set the network connection state to be idle
S319 Set the network connection state to be failed
End

ELECTRONIC DEVICE AND METHOD FOR SELECTING ACCESS POINT NAME

CROSS-REFERENCE TO RELATED APPLICATIONS

This application claims priority to Chinese Patent Application No. 201310465797.8 filed on Oct. 8, 2013, the contents of which are incorporated by reference herein.

FIELD

Embodiments of the present disclosure relate to network connection technology, and particularly to selecting an Access Point Name (APN) using an electronic device.

BACKGROUND

An electronic device can connect to a network using an Access Point Name (APN). The APN can correspond with a desired network service for the electronic device, the desired network service to be provided by a predetermined telecom company. For example, if the electronic device is to connect to the network using a third Generation (3G) network provided by the China Unicom, the 3GWAP can be used as the APN.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
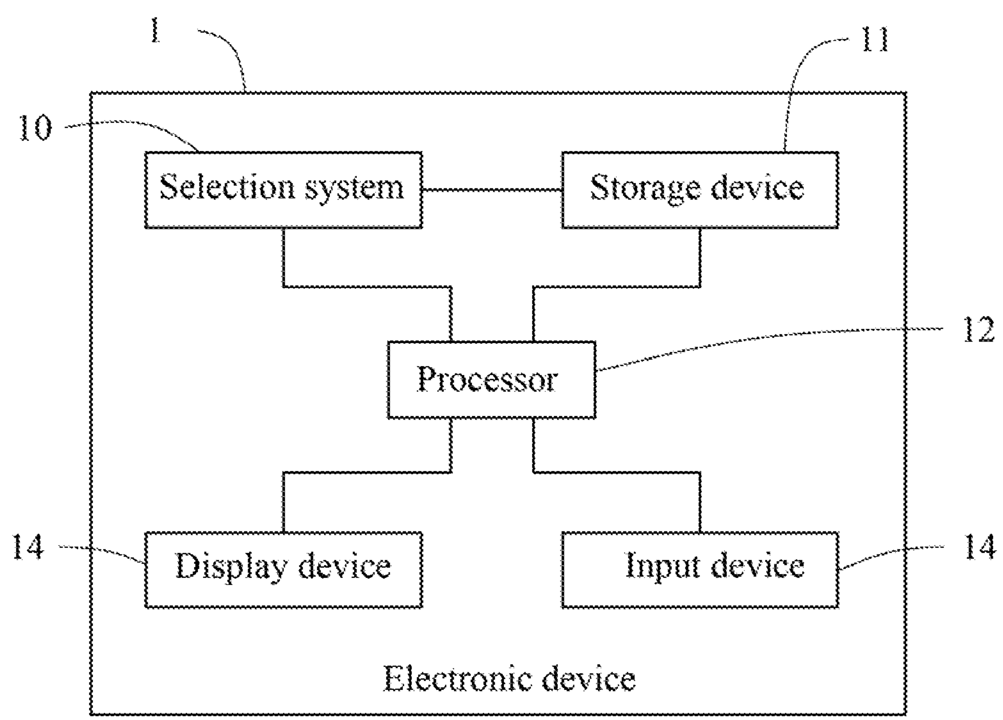
FIG. 1 is a diagrammatic view of one embodiment of an electronic device including an APN selection system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a diagrammatic view of one embodiment of an electronic device. Depending on the embodiment, the electronic device 1 includes a selection system 10 in relation to a plurality of Access Point Names (APNs). The electronic device 1 includes, but is not limited to, a storage device 11, at least one processor 12, a display device 13, and an input device 14. The electronic device 1 can be a server, a computer, a smart phone, a personal digital assistant (PDA), or another suitable electronic device. FIG. 1 illustrates only one example of the electronic device that can include more or fewer components than illustrated, or have a different configuration of the various components in other embodiments.

The selection system 10 stores an Access Point Name (APN) list in the storage device 11. Each APN in the APN list has a priority. The selection system 10 can select an APN having a highest priority. The selection system 10 establishes a connection between the electronic device 1 and a predetermined network (e.g., the Internet) using the selected APN. The selection system 10 also provides a default APN for a user. The default APN corresponds to a service provided by a predetermined telecom company.

In at least one embodiment, the storage device 11 can include various types of non-transitory computer-readable storage mediums, such as a hard disk, a compact disc, a digital video disc, or a tape drive. The display device 13 can display images and videos, and the input device 14 for user inputs can be a mouse, a keyboard, or a touch panel.

Figure 2:
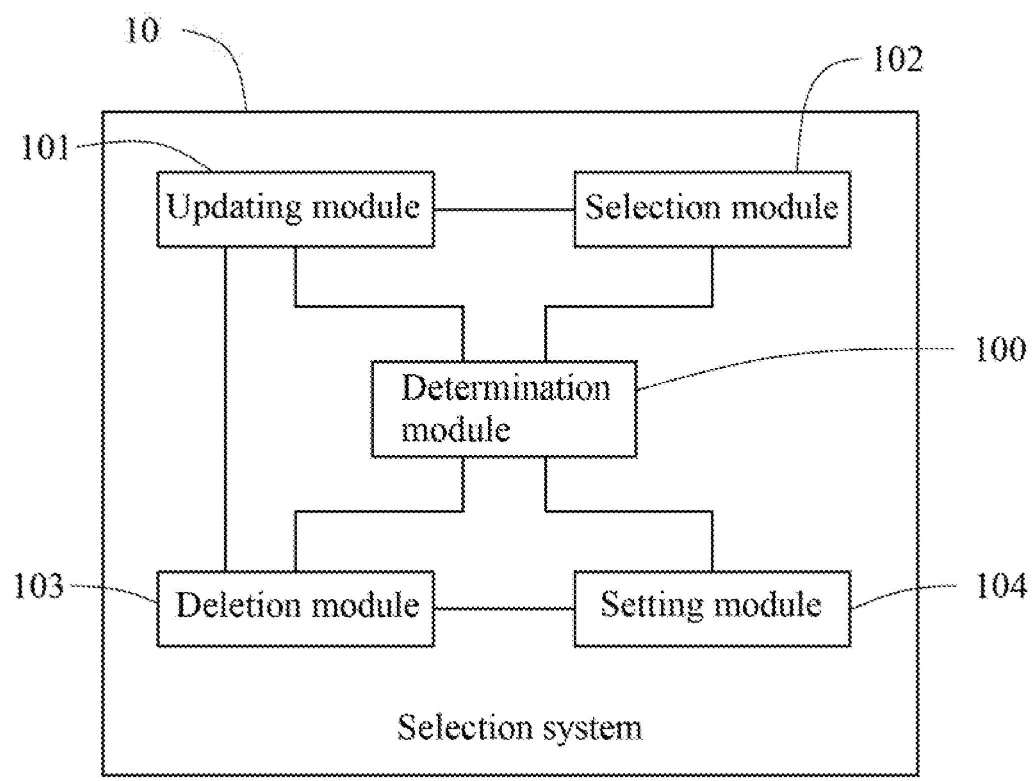
FIG. 2 is a diagrammatic view of one embodiment of function modules of the selection system in the electronic device of FIG. 1.

FIG. 2 is a diagrammatic view of one embodiment of function modules of the selection system. In at least one embodiment, the selection system 10 can include a determination module 100, an updating module 101, a selection module 102, a deletion module 103, and a setting module 104. The function modules 100, 101, 102, 103 and 104 can include computerized codes in the form of one or more programs, which are stored in the storage device 11. The at least one processor executes the computerized codes to provide functions of the function modules 100-104.

The determination module 100 determines whether a network connection state of the electronic device 1 is idle. In at least one embodiment, when the network connection state of the electronic device 1 is idle, it is represented that the APN list has no APN, the updating module 101 updates the APN list by inserting one or more APNs. In at least one embodiment, the storage device 11 can store a preferred APN and/or a default APN. When the storage device 11 stores the preferred APN, the updating module 101 stores the preferred APN in the APN list. When the storage device 11 does not store the preferred APN and the storage device 11 stores the default APN, the updating module 101 stores the default APN in the APN list. When the storage device 11 does not store the preferred APN and the default APN, the updating module 101 stores APNs provided by telecom corporations in the APN list. When the storage device 11 stores the preferred APN and the default APN, the updating module 101 stores the preferred APN in the APN list. The default APN may correspond to the service of the electronic device 1 provided by the predetermined telecom company. For example, if the electronic device is connected to the network using a 3G network provided by the China Unicom, the APN is desired to be 3GWAP.

When the network connection state of the electronic device 1 is scanning, it is represented that the APN list has at least one APN. As mentioned above, each APN in the APN list has a priority, the selection module 102 selects one APN having a highest priority from the APN list.

The determination module 100 determines whether a connection is established between the electronic device 1 and a wide area network using the selected APN. When the connection is established using the selected APN, the determination module 100 determines the selected APN to be the preferred APN. When no connection is established using the selected APN, the deletion module 103 deletes the selected APN from the APN list.

The determination module 100 determines whether the APN list has other APNs. When the APN list is not null, the determination module 100 determines that the APN list still has other APNs. The setting module 104 sets the network connection state to be scanning, and then the selection module 102 selects one APN from the APN list.

When no connection is established using the selected APN and any other APNs in the APN list, the determination module 100 determines whether the selected APN and the other APNs are inactive. When the selected APN and the other APNs are inactive, the updating module 101 does not update the selected APN and the other APNs in the APN list, and the setting module 104 sets the network connection state to be failed, the procedure ends. When at least one of the selected APN and the other APNs are active, the setting module 104 sets the network connection state to be idle, and then returns to the selection module 102. The selection module 102 reselects an updated APN by executing the step of selecting one APN from the APN list. The detail of the procedure is shown in FIG. 3.

Figure 3:
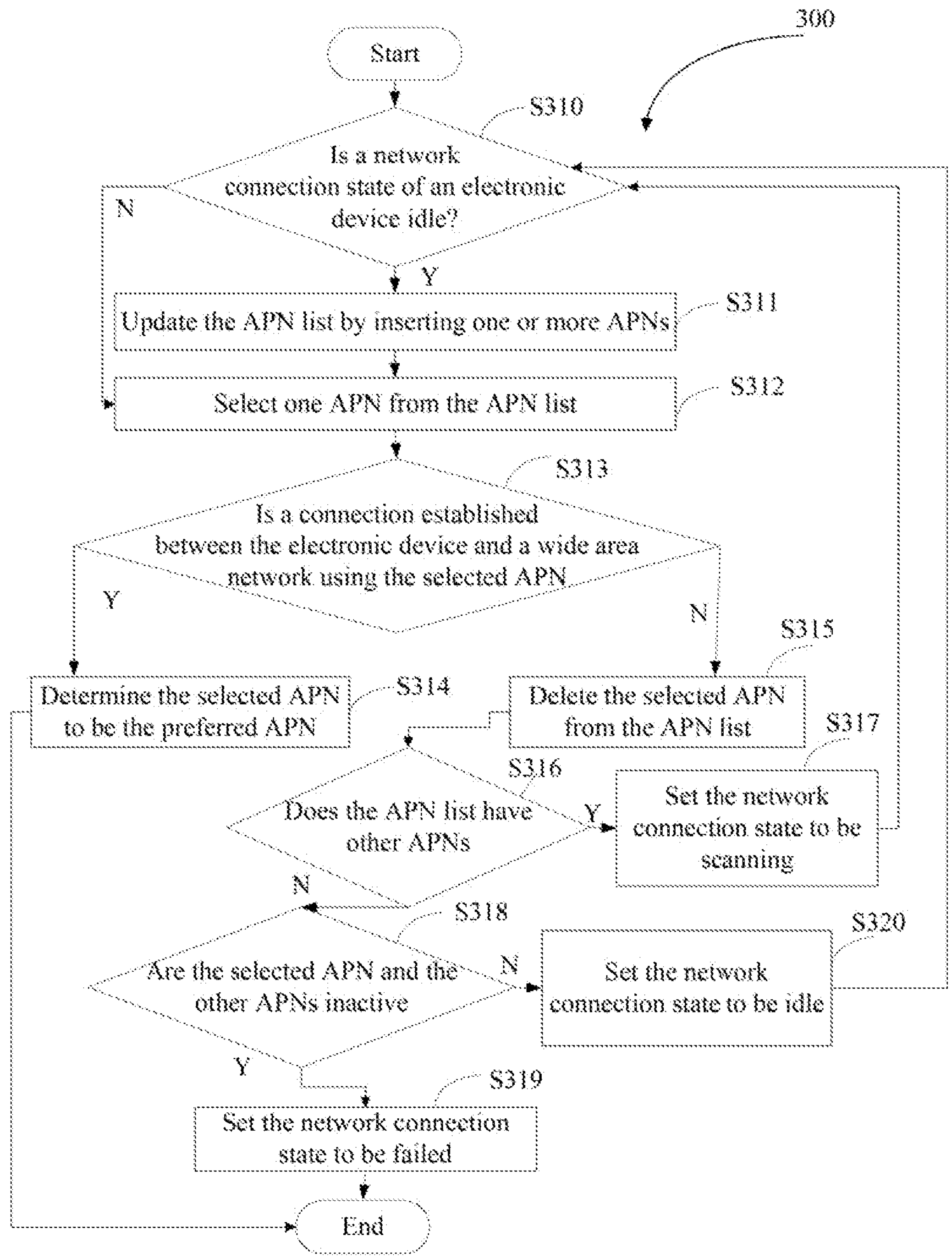
FIG. 3 illustrates a flowchart of one embodiment of a method for selecting an APN in the electronic device of FIG. 1.

FIG. 3 illustrates a flowchart is presented in accordance with an example embodiment. The example method 300 is provided by way of example, as there are a variety of ways to carry out the method. The method 300 described below can be carried out using the configurations illustrated in FIGS. 1 and 2 for example, and various elements of these figures are referenced in explaining example method 300. Each block shown in FIG. 3 represents one or more processes, methods, or subroutines carried out in the exemplary method 300. Additionally, the illustrated order of blocks is by example only and the order of the blocks can be changed. The exemplary method 300 can begin at block 301. Depending on the embodiment, additional steps can be added, others removed, and the ordering of the steps can be changed.

In block 310, a determination module determines whether a network connection state of an electronic device is idle. In at least one embodiment, when the network connection state of the electronic device is idle, it is represented that an APN list which is stored in a storage device of the electronic device has no APN, then the exemplary method 300 goes to block 311.

In block 311, an updating module updates the APN list by inserting one or more APNs. In at least one embodiment, the storage device can store a preferred APN and/or a default APN. When the storage device 11 stores the preferred APN in the APN list. When the storage device does not store the preferred APN and the storage device stores the default APN, the updating module stores the default APN in the APN list. When the storage device does not store the preferred APN and the default APN, the updating module stores APNs provided by telecom corporations in the APN list. When the storage device stores the preferred APN and the default APN, the updating module stores the preferred APN in the APN list. The default APN may correspond to the service of the electronic device provided by the predetermined telecom company. For example, if the electronic device is connected to the network using a 3G network provided by the China Unicom, the APN is desired to be 3GWAP.

When the network connection state of the electronic device is not idle, the network connection state of the electronic device can be scanning, it is represented that the APN list has at least one APN, then the exemplary method 300 goes to block 312. In block 312, a selection module selects one APN from the APN list. In at least one embodiment, each APN in the APN list has a priority. The selection module selects one APN having a highest priority, from the APN list.

In block 313, the determination module determines whether a connection is established between the electronic device and a wide area network using the selected APN. When the connection is established using the selected APN, then the exemplary method 300 goes to block 314. In block 314, the determination module determines the selected APN to be the preferred APN, then the procedure ends.

When no connection is established using the selected APN, then the exemplary method 300 goes to block 315. In block 315, a deletion module deletes the selected APN from the APN list, then the exemplary method 300 goes to block 316.

In block 316, the determination module determines whether the APN list has other APNs. When the APN list is not null, the determination module 100 determines that the APN list still has other APNs, then the exemplary method 300 goes to block 317. In block 317, a setting module sets the network connection state to be scanning, and then return to block 310. When no connection is established using the selected APN and the other APNs, then the exemplary method 300 goes to block 318.

In block 318, the determination module determines whether the selected APN and the other APNs are inactive. When the selected APN and the other APNs are inactive, the exemplary method 300 goes to block 319. When at least one of the selected APN and the other APNs are active, the exemplary method 300 goes to block 320.

In block 319, the setting module sets the network connection state to be failed, the updating module does not update the selected APN and the other APNs in the APN list, the procedure ends.

In block 320, when at least one of the selected APN and the other APNs are active, the setting module sets the network connection state to be idle, then returns to block 310.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for selecting an Access Point Name (APN) using an electronic device, the electronic device comprising a storage device that stores a APN list, the method comprising:
selecting one APN from the APN list when a network connection state of the electronic device is idle and the APN list has at least one APN;
updating the APN list by inserting one or more APNs when the network connection state is idle and the APN list has no APN;
wherein the APN list is updated by:
storing the preferred APN in the APN list when the preferred APN is stored in the storage device:
storing a default APN in the APN list when the storage device does not store the preferred APN and the storage device stores the default APN; and
storing APNs provided by telecom corporations in the APN list when the storage device does not store the preferred APN and the default APN;
establishing a connection between the electronic device and a wide area network using the selected APN; and
when the connection is established using the selected APN, determining the selected APN to be a preferred APN.

2. The method according to claim 1, further comprising:
when no connection is established using the selected APN, deleting the selected APN from the APN list;
determining whether the AP list has any other APNs; and
when the APN list has other APNs, setting the network connection state to be scanning and executing the step of selecting one APN from the APN list.

3. The method according to claim 2, further comprising:
when no connection is established using the selected APN and the other APNs, and the selected APN and the other APNs are inactive, setting the network connection state to be failed; or
when no connection is established using the selected APN and the other APNs, and at least one of the selected APN and the other APNs is active, setting the network connection state to be idle and reselecting an updated APN by executing the step of selecting one APN from the APN list.

4. The method according to claim 1, wherein the default APN corresponds to a service of the electronic device provided by a predetermined telecom company.

5. The method according to claim 1, wherein each APN in the APN list has a priority, the selected APN has a highest priority.

6. An electronic device, comprising:
at least one processor; and
a storage device that stores one or more programs and stores a APN list, when executed by the at least one processor, cause the at least one processor to:
select one APN from the APN list when a network connection state of the electronic device is idle and the APN list has at least one APN;
update the APN list by inserting one or more APNs when the network connection state is idle and the APN list has no APN;
wherein the APN list is updated by:
storing the preferred APN in the APN list when the preferred APN is stored in the storage device:
storing a default APN in the APN list when the storage device does not store the preferred APN and the storage device stores the default APN; and
storing APNs provided by telecom corporations in the APN list when the storage device does not store the preferred APN and the default APN;
establish a connection between the electronic device and a wide area network using the selected APN; and
when the connection is established using the selected APN, determine the selected APN to be a preferred APN.

7. The electronic device according to claim 6, wherein the at least one processor is caused to:
when no connection is established using the selected APN, delete the selected APN from the APN list;
determine whether the AP list has any other APNs; and
when the APN list has other APNs, set the network connection state to be scanning and execute the step of selecting one APN from the APN list.

8. The electronic device according to claim 7, wherein the at least one processor is caused to:
when no connection is established using the selected APN and the other APNs, and the selected APN and the other APNs are inactive, set the network connection state to be failed; or
when no connection is established using the selected APN and the other APNs, and at least one of the selected APN and the other APNs is active, set the network connection state to be idle and reselect an updated APN by executing the step of selecting one APN from the APN list.

9. The electronic device according to claim 6, wherein the default APN corresponds to a service of the electronic device provided by a predetermined telecom company.

10. A non-transitory storage medium having stored thereon instructions that, when executed by a processor of an electronic device, causes the processor to perform a method of selecting an Access Point Name (APN), the electronic device comprising a storage device that stores a APN list, wherein the method comprises:
selecting one APN from the APN list when a network connection state of the electronic device is idle and the APN list has at least one APN;
updating the APN list by inserting one or more APNs when the network connection state is idle and the APN list has no APN;
wherein the APN list is updated by:
storing the preferred APN in the APN list when the preferred APN is stored in the storage device;
storing a default APN in the APN list when the storage device does not store the preferred APN and the storage device stores the default APN; and
storing APNs provided by telecom corporations in the APN list when the storage device does not store the preferred APN and the default APN;
establishing a connection between the electronic device and a wide area network using the selected APN; and
when the connection is established using the selected APN, determining the selected APN to be a preferred APN.

11. The non-transitory storage medium according to claim 10, wherein the method comprises:
when no connection is established using the selected APN, deleting the selected APN from the APN list;
determining whether the AP list has any other APNs; and when the APN list has other APNs, setting the network connection state to be scanning and executing the step of selecting one APN from the APN list.

12. The non-transitory storage medium according to claim 11, wherein the method comprises:

when no connection is established using the selected APN and the other APNs, and the selected APN and the other APNs are inactive, setting the network connection state to be failed; or when no connection is established using the selected APN and the other APNs, and at least one of the selected APN and the other APNs is active, setting the network connection state to be idle and reselecting an updated APN by executing the step of selecting one APN from the APN list.

13. The non-transitory storage medium according to claim 10, wherein the default APN corresponds to a service of the electronic device provided by a predetermined telecom company.

14. The non-transitory storage medium according to claim 10, wherein each APN in the APN list has a priority, the selected APN has a highest priority.

* * * * *